July 26, 1938.    J. FIEUX    2,124,817
GYROSCOPE
Filed Aug. 26, 1936    3 Sheets-Sheet 1

Inventor
Jean Fieux
By Cameron, Kerkam & Sutton
Attorneys

July 26, 1938.   J. FIEUX   2,124,817
GYROSCOPE
Filed Aug. 26, 1936   3 Sheets-Sheet 2

Inventor
Jean Fieux
By Cameron, Kerkam & Sutton
Attorneys

July 26, 1938.  J. FIEUX  2,124,817
GYROSCOPE
Filed Aug. 26, 1936  3 Sheets-Sheet 3

Inventor
Jean Fieux
By Cameron, Kerkam & Sutton
Attorneys

Patented July 26, 1938

2,124,817

UNITED STATES PATENT OFFICE 2,124,817

GYROSCOPE

Jean Fieux, Paris, France, assignor of one-half to Schneider & Cie, Paris, France, a joint stock company of France Application August 26, 1936, Serial No. 98,049
In France January 4, 1936

13 Claims. (Cl. 74—5)

It is known that, in the gyroscopes constructed according to the usual technique the rotating mass which constitutes the gyroscope proper, is set and maintained in motion by means of an electric motor having its rotor fixed to the same shaft as the rotating mass, which in its turn is journalled in a casing carrying the stator of the motor.

Since it is thus integral with the gyroscopic mass, at least as concerns one of the said elements, the aforesaid driving motor can only be of a very special type and of a quite particular construction which does not lend itself well to the addition of an automatic regulating device.

Consequently, it most frequently requires a particular supply network, that is to say, a relatively heavy and costly auxiliary installation. In any case, it requires the application of leads which are generally difficult to construct and which, although deformable, always give rise in the suspension device to additional resistances and friction resulting in incorrect operation.

Furthermore, the motive power being developed and applied wholly within the casing, it cannot in any way give rise to certain continuous correction effects which are known by the name of "erecting" correction or automatic return and which are practically indispensable in certain cases of prolonged use.

For this reason, such gyroscopes have to be provided with auxiliary compensating devices so as to be able to retain indefinitely, despite the movements of the support, a practically fixed angular position capable of serving as a reference.

The present invention relates to a gyroscope comprising a friction driving device which obviates the employment both of the electric driving mechanism and of the power transmission leads, which are difficult to construct and are referred to in the foregoing, and also of the accessory compensating devices the addition of which has been required, while nevertheless affording the combined advantages of being technically simple, easy of adaptation and correct in operation.

The gyroscopes according to the invention comprise means of an essentially mechanical character for imparting, maintaining and limiting with precision the velocity of spin of the gyroscopic mass, and also for producing automatically, if necessary, according to a logical law, the continuous correction of the angular position of the gyroscope having a plurality of degrees of freedom. The said means, however, do not create any reactions or sluggishness detrimental to the correction of the operation in the special case in which the suspension comprises only one degree of freedom, for example in the case of the tachymetric gyroscope.

The construction of these gyroscopes is independent of the type of motor adopted for driving the rotating mass. Their use does not require in any case the installation of a special supply network.

The gyroscopes constructed according to the invention may also have the advantage of reduced size, their articulated suspension system being adapted to be housed with facility in the interior of the spherical element.

Three forms of construction of the invention are described hereinafter and illustrated in the accompanying drawings by way of example only, these embodiments corresponding to three different forms of connection between the gyroscope proper and the frame carrying the stator of the driving motor. In the drawings, wherein like reference characters indicate like parts throughout the several views:—

Figure 1:
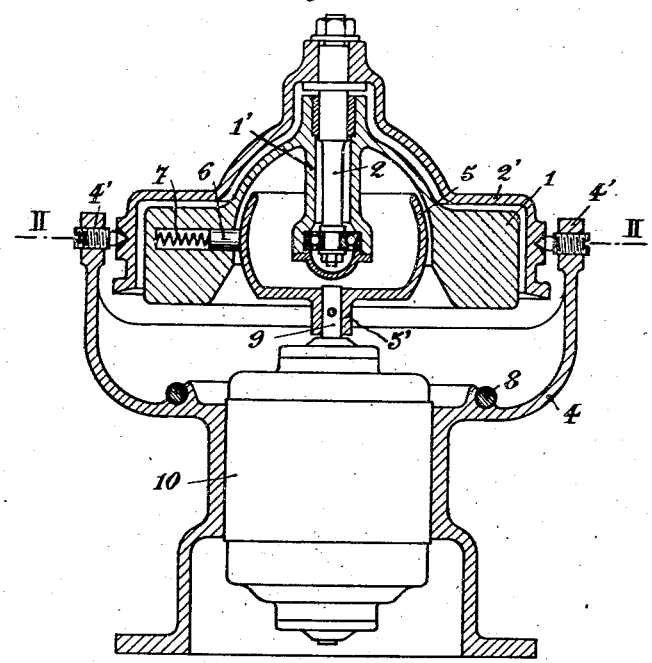
Figure 1 is an axial section on the line I—I of Figure 2 of a device whose suspension comprises only one swivelling axis.
Figure 2:
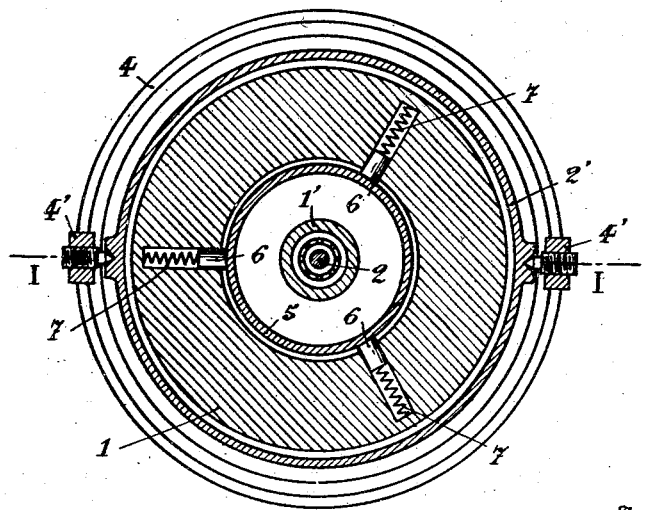
Figure 2 is a section on line II—II of Figure 1.

Referring first to Figures 1 and 2, there is shown therein a gyroscopic mass comprising a relatively massive rim I and a supporting hub I' which is rotatably mounted on a support consisting of a bearing carrying member or spindle 2 and a body member 2'. The support 2—2' is in turn pivotally supported at two diametrically opposite points between the upstanding arms 4' of a suspension frame or cradle 4.

The central portion of the gyroscopic mass I—I' is provided with a spherically shaped cavity or recess into which extends a hollow, substantially bowl-shaped rotor or driving member 5 having a correspondingly spherical external surface spaced from the surface of said recess. As will be seen from Figure 1, the center of the spherical surface of rotor member 5 is substantially coincident with the center of the pivotal axis of support 2—2'. The rotor member 5 is rotatably supported relatively to the frame 4—4' on the shaft 9 of a driving motor 10, said motor being mounted on the frame 4 and having its shaft 9 extending into and fixed to a cylindrical sleeve 5' carried by the rotor member 5.

The rim 1 of the gyroscopic mass carries at equally spaced points around the periphery of the cavity therein three wipers or brushes 6 which are slidably housed within radially extending recesses 6' and are constantly urged inwardly in a direction substantially normal to and toward contact with the spherical surface of the rotor member 5 by means of pressure springs 7. Due to the pressure exerted by the wipers 6 on the spherical surface of the rotor member 5 which is continuously rotated by motor 10, a frictional drive is effected between these members which produces and maintains the rotation of the gyroscopic mass 1—1'. Inasmuch as the effectiveness of this frictional drive varies inversely as a function of the speed of rotation of the gyroscopic mass because of the action of centrifugal force upon the wipers or brushes, the angular speed of the gyroscopic mass is limited to the value for which there is practically equilibrium between the centrifugal force exerted on the wipers and the pressure of springs 7, even though the angular speed of the spherical rotary driving element 5 is maintained at a substantially higher value by the driving motor 10.

On the frame 4 is disposed a ring 8 of flexible or resilient material forming a stop member for limiting the angular movements of the support 2—2'.

Figure 3:
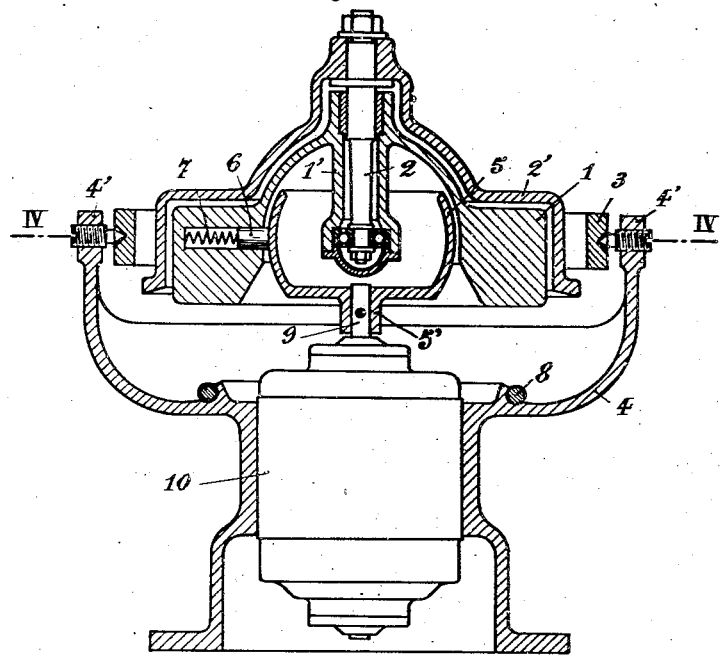
Figure 3 is an axial section on line III—III of Figure 4 of a device whose suspension comprises two pivoting axes.
Figure 4:
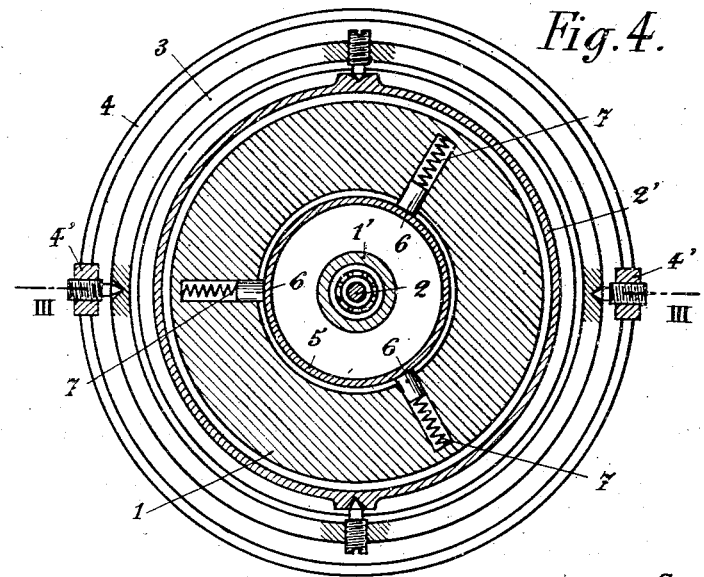
Figure 4 is a section on the line IV—IV of Figure 3.

The device of Figures 3 and 4 is of practically the same construction as that shown in Figures 1 and 2 with the exception that the support 2—2' of this second embodiment of the invention is mounted on the frame 4—4' by means of a gimbal ring 3 so as to be capable of movement relatively to said frame about two axes at right angles to one another. As will appear from Figures 3 and 4, the center of the spherical surface of rotor member 5 in this form of the invention is substantially coincident with the center of articulation of the support 2—2' and the frame 4—4'.

Figure 5:
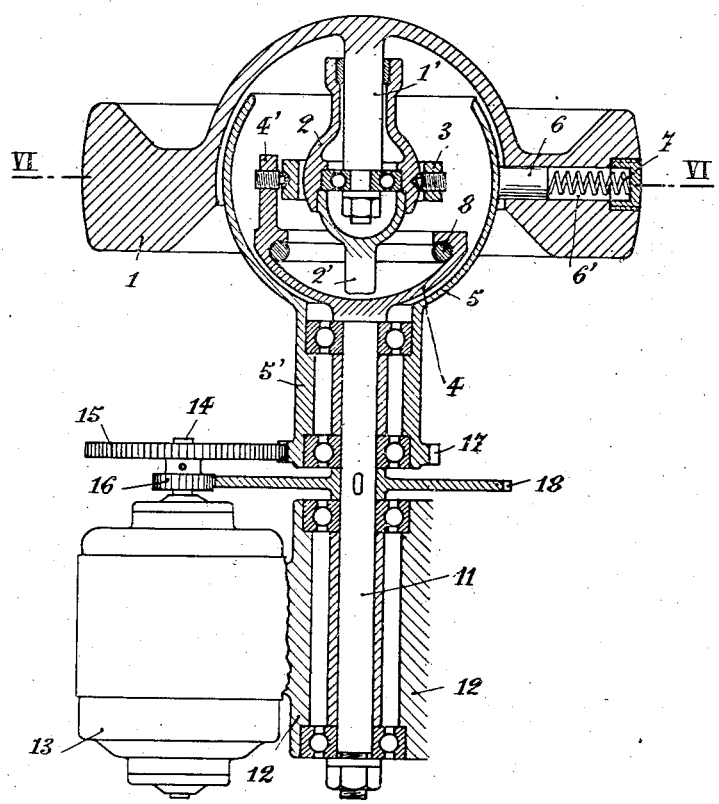
Figure 5 is a section along two axial planes from V to V of Figure 6 of a device in which the frame or cradle itself is adapted to be given a movement of rotation of low velocity.
Figure 6:
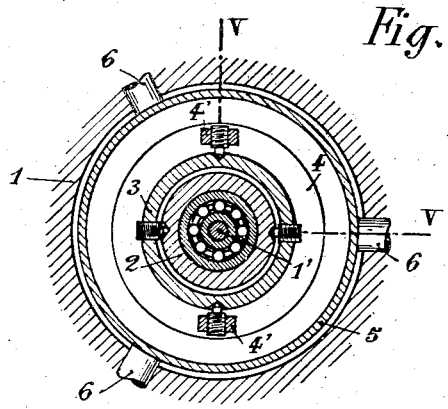
Figure 6 is a partial section on the line VI—VI of Figure 5.

In the construction illustrated in Figures 5 and 6, the frame or cradle 4—4' is itself so mounted as to be capable of a slow rotation about the axis of the driving rotor member 5, and is positioned internally, rather than externally, of the gyroscopic mass 1—1'. As shown, the frame 4 is housed within the bowl-shaped rotor member 5 and has connected thereto a shaft 11 which is journalled in suitable bearings in an auxiliary frame 12, the latter also supporting the driving motor 13. Fixed to the shaft 14 of the motor 13 are gears 15 and 16 which mesh with and drive gears 17 and 18, respectively, gear 17 being integral with the sleeve or barrel 5' of rotor member 5 while gear 18 is keyed to the shaft 11 of the frame 4. Sleeve 5' surrounds and is journalled upon the upper portion of shaft 11. As shown in Figure 5, the diameter of gear 18 is considerably greater than that of gear 16, thus effecting a speed reduction between the motor 13 and shaft 11, whereas the greater diameter of gear 15 relatively to that of gear 17 effects a speed increase between the motor and the rotor member 5. The slow movement of rotation thus imparted to the frame 4, and thence to the suspension system supported thereby, has the effect of practically neutralizing the deviations of the gyroscopic mass which may result from imperfect balancing by causing the unbalance to pass successively through all azimuths.

The specific form of rotatable support for the gyroscopic mass in Figures 5 and 6 also differs from that shown in Figures 1–4, inclusive, in that the hub 1' is formed as a solid spindle while the bearing carrying member 2 is of sleeve-like construction, instead of vice versa; however, it is obvious that these are fully equivalent arrangements both structurally and functionally.

In the devices thus described, the driving motor is loaded by the resistant couple resulting from the friction of the brushes 6 on the spherical part of the sleeve 5.

The gyroscopic mass 1—1' is driven in a movement of rotation, the speed of which only ceases to increase when the centrifugal force exerted on the brushes in opposition to the tension of the springs 7 has reduced the value of the said couple to the value of the couple of the passive resistances (resistance of the air to the rotation of the mass and the mechanical friction of the pivoting members).

There is thus provided automatically a precise limitation of the velocity of spin of the gyroscopic mass, the sleeve 5 of spherical surface finally rotating at the highest speed imposed by the running of the motor. From the difference in the tangential speeds of the two elements there results a permanent slipping of the brushes which are thus subjected to zig-zag frictional effects as soon as, for any reason whatsoever, the axis of spin of the mass 1—1' and the axis of rotation of the sleeve 5 cease to have the same direction.

These zig-zag frictional effects give rise to a couple of tangential forces, one component of which maintains the speed of the gyroscopic mass, and the other component, which remains practically ineffective in the case in which the suspension of the support 2—2' has only one degree of freedom (Figures 1 and 2), produces when the suspension of the frame has several degrees of freedom (Figures 3, 4, 5 and 6) the "erecting" correction effect referred to hereinbefore; that is to say, the continuous return of the axis of spin of the said gyroscopic mass to the direction of the axis of rotation of the sleeve 5.

The consequence of this zig-zag effect is on the one hand that the speed of return or erecting is lower, the greater is the difference between the velocities of spin of the gyroscopic mass 1—1' and of the rotor 5, and on the other hand that the said speed of return or erecting is a function of the instantaneous angle which the axis of the said gyroscopic mass and the axis of the said rotor make between them.

It results from this that, despite the angular displacements of all orders, more or less considerable, which the frame 4 may undergo, the latter generally pertaining to systems subjected to oscillations (pendulous system on board a ship's hull, aeroplane fuselage and the like), the axis of the gyroscopic mass is itself only subject, from the point of view of its direction, to extremely slow variations constantly directed towards the instantaneous position of the axis of the rotor 5 connected to the frame 4, and that, in consequence, the said axis of the gyroscopic mass has not practically the time to depart appreciably from the "mean" or "theoretical" position of the axis of the rotor 5, and consequently becomes capable of constituting a satisfactory "reference".

However, in the case in which the suspension of the gyroscopic system (1—1', 2—2') has a lack of balance relatively to its centre, which is its centre of articulation, the returning effect cannot be complete, because it ceases as soon as the component producing it ceases to be greater than the out-of-balance couple resulting from the aforesaid lack of balance.

In order to obviate this disadvantage for certain cases of application, a slow, regular, and continuous variation of the orientation of the lack of balance may be produced by rotating slowly the whole of the frame 4 and of the suspension system, utilizing for this purpose the driving motor of the sleeve or rotor 5 (see Figure 5).

It should be remarked that the devices constructed according to the invention provide complete gyrostats, equivalent to the ordinary gyrostats having a suspended casing, and at the same time obviate the justified criticisms which are levelled against simple "spinning tops", in which the suspension system of the gyroscopic mass is reduced to a spherical swivel pivot constituting one of the elements of a friction clutch.

Although three different forms of the invention have been described and illustrated in the accompanying drawings, it will be obvious that the invention is not limited to the specific structures disclosed but is capable of a variety of mechanical embodiments. Various changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:—

1. In a gyroscope, a frame member, a driving element rotatably supported relatively to said frame member with its axis of rotation fixed with respect to said frame member, means for rotating said driving element, a support mounted on said frame member for movement relative thereto about at least one axis, a gyroscopic mass rotatably mounted on said support for rotation about an axis normally in alignment with the axis of rotation of said driving element, and means constituting a frictional driving connection between said driving element and said gyroscopic mass.

2. In a gyroscope, a frame member, a driving element rotatably supported relatively to said frame member with its axis of rotation fixed with respect to said frame member, means for rotating said driving element, a support mounted on said frame member for movement relative thereto about at least one axis, a gyroscopic mass rotatably mounted on said support for rotation about an axis normally in alignment with the axis of rotation of said driving element, and means constituting a frictional driving connection between said driving element and said gyroscopic mass, the effectiveness of said frictional driving connection varying inversely as a function of the speed of rotation of said gyroscopic mass.

3. In a gyroscope, a frame member, a driving element rotatably supported relatively to said frame member with its axis of rotation fixed with respect to said frame member, means for rotating said driving element, a support mounted on said frame member for movement relative thereto about at least one axis, a gyroscopic mass rotatably mounted on said support for rotation about an axis normally in alignment with the axis of rotation of said driving element, and centrifugally controlled friction clutch means interposed between said driving element and said gyroscopic mass through which the latter is driven from the former.

4. In a gyroscope, a frame member, a driving element rotatably supported relatively to said frame member, at least a portion of said driving element having a substantially spherical surface, means for rotating said driving element, a support mounted on said frame member for movement relative thereto about at least one axis, a gyroscopic mass rotatably mounted on said support for rotation about an axis normally in alignment with the axis of rotation of said driving element, and a plurality of friction members carried by said gyroscopic mass and yieldably urged toward contact with the substantially spherical surface of said driving element.

5. In a gyroscope, a frame member, a driving element rotatably supported relatively to said frame member, at least a portion of said driving element having a substantially spherical surface, means for rotating said driving element, a support mounted on said frame member for movement relative thereto about at least one axis, a gyroscopic mass rotatably mounted on said support for rotation about an axis normally in alignment with the axis of rotation of said driving element, and a plurality of friction members carried by said gyroscopic mass and yieldably urged toward contact with the substantially spherical surface of said driving element, said friction elements being so constructed and arranged that the pressure exerted thereby against said driving element varies inversely as a function of the speed of rotation of said gyroscopic mass.

6. In a gyroscope, a frame member, a driving element rotatably supported relatively to said frame member, at least a portion of said driving element having a substantially spherical surface, means for rotating said driving element, a support mounted on said frame member for movement relative thereto about at least one axis, a gyroscopic mass rotatably mounted on said support for rotation about an axis normally in alignment with the axis of rotation of said driving element, a plurality of wiper members carried by said gyroscopic mass and extending toward the substantially spherical surface of said driving element, and yieldable means normally maintaining said wiper members in frictional contact with said driving element, said wiper members and yieldable means being so constructed and arranged with the effectiveness of the frictional driving connection between the driving element and gyroscopic mass established thereby, varies inversely as a function of the speed of rotation of said gyroscopic mass.

7. In a gyroscope, a frame member, a driving element rotatably supported relatively to said frame member, at least a portion of said driving element having a substantially spherical surface, means for rotating said driving element, a support mounted on said frame member for movement relative thereto about at least one axis, a gyroscopic mass surrounding the substantially spherically surfaced portion of said driving element and rotatably mounted on said support for rotation about an axis normally in alignment with the axis of rotation of said driving element, and a plurality of friction members carried by said gyroscopic mass and yieldably urged inwardly toward said substantially spherical surface, the effectiveness of the frictional driving connection between the driving element and gyroscopic mass established thereby varying inversely as a function of the centrifugal force exerted on said frictional members.

8. A gyroscope according to claim 4 wherein each axis about which said support may move relatively to said frame member passes substantially through the center of the spherically surfaced portion of said driving element.

9. In a gyroscope, a frame member, a driving element rotatably supported relatively to said frame member, means for rotating said driving element, a support mounted on said frame member for movement relative thereto about at least one axis, a gyroscopic mass rotatably mounted on said support for rotation about an axis normally in alignment with the axis of rotation of said driving element, means constituting a frictional driving connection between said driving element and said gyroscopic mass, an auxiliary frame on which said frame member is mounted for rotation about an axis coincident with the axis of rotation of said driving element, and means for slowly rotating said frame member about its said axis relatively to said auxiliary frame.

10. In a gyroscope, a frame member, a driving element rotatably supported relatively to said frame member, an auxiliary frame on which said frame member is mounted for rotation about an axis coincident with the axis of rotation of said driving element, a motor mounted on said auxiliary frame, transmission means for simultaneously driving both said frame member and said driving element from said motor, said transmission means being so constructed and arranged as to impart to said frame member a relatively slow speed of rotation and to said driving element a relatively rapid speed of rotation, a support mounted on said frame member for movement relative thereto about at least one axis, a gyroscopic mass rotatably mounted on said support for rotation about an axis normally in alignment with the axes of rotation of said frame member and driving element, and means constituting a frictional driving connection between said driving element and said gyroscopic mass.

11. In a gyroscope, a rotatable driving element, a gyroscopic mass, means independent of said driving element for supporting said gyroscopic mass for rotation about an axis normally in alignment with the axis of rotation of said driving element, said supporting means being mounted for movement relative to said driving element about at least one axis so as to permit the axis of rotation of said gyroscopic mass to assume an angular position with respect to the axis of rotation of said driving element, and means constituting a frictional driving connection between said driving element and said gyroscopic mass regardless of the angularity between the axis of rotation of said element and mass, the effectiveness of said frictional driving connection varying inversely as a function of the speed of rotation of said gyroscopic mass.

12. A gyroscope according to claim 4 wherein said gyroscopic mass is provided with a spherically shaped recess into which the spherically surfaced portion of said driving element extends.

13. A gyroscope according to claim 1 wherein said driving element is provided with a recess in which are housed both said frame member and said support.

JEAN FIEUX.